United States Patent
Yasukawa et al.

(10) Patent No.: US 10,051,657 B2
(45) Date of Patent: *Aug. 14, 2018

(54) USER TERMINAL, RADIO BASE STATION AND RADIO COMMUNICATION METHOD

(71) Applicant: NTT DOCOMO, INC., Tokyo (JP)

(72) Inventors: Shimpei Yasukawa, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/110,956

(22) PCT Filed: Dec. 24, 2014

(86) PCT No.: PCT/JP2014/084155
§ 371 (c)(1),
(2) Date: Jul. 12, 2016

(87) PCT Pub. No.: WO2015/107842
PCT Pub. Date: Jul. 23, 2015

(65) Prior Publication Data
US 2016/0337109 A1 Nov. 17, 2016

(30) Foreign Application Priority Data
Jan. 14, 2014 (JP) .................................. 2014-004620

(51) Int. Cl.
*H04W 72/12* (2009.01)
*H04W 72/04* (2009.01)
(Continued)

(52) U.S. Cl.
CPC .......... *H04W 72/1289* (2013.01); *H04L 5/14* (2013.01); *H04W 72/042* (2013.01);
(Continued)

(58) Field of Classification Search
CPC ............. H04W 7/15557; H04W 52/14; H04W 72/0413; H04W 72/042; H04W 72/1268;
(Continued)

(56) References Cited

U.S. PATENT DOCUMENTS

2014/0003387 A1   1/2014  Lee et al.
2014/0029484 A1*  1/2014  Choi .................... H04J 3/1694
                                                              370/280
(Continued)

OTHER PUBLICATIONS

International Search Report issued in corresponding application No. PCT/JP2014/084155 dated Apr. 7, 2015 (4 pages).
(Continued)

*Primary Examiner* — Ashley L Shivers
(74) *Attorney, Agent, or Firm* — Osha Liang LLP

(57) ABSTRACT

The present invention is designed to implement dynamic TDD that does not rely on TDD-FDD CA-based TDD UL-DL configurations. A user terminal executes radio communication with a plurality of cells by employing carrier aggregation, and has a receiving section that, when a connection is established with a secondary cell serving as a dynamic TDD cell, receives control information, which is transmitted from a primary cell and which includes a dynamic command with respect to a subframe configuration of the dynamic TDD cell, and a control section that decides whether or not one or a plurality of subframes in the dynamic TDD cell are uplink subframes or downlink subframes based on the control information, and, furthermore, controls operations pertaining to the dynamic TDD cell.

10 Claims, 12 Drawing Sheets

(51) Int. Cl.
*H04L 5/14* (2006.01)
*H04W 88/02* (2009.01)

(52) U.S. Cl.
CPC ... *H04W 72/0406* (2013.01); *H04W 72/0446* (2013.01); *H04W 72/1273* (2013.01); *H04W 88/02* (2013.01)

(58) Field of Classification Search
CPC ......... H04W 72/1273; H04W 72/1284; H04W 72/1289
See application file for complete search history.

(56) References Cited

U.S. PATENT DOCUMENTS

2014/0204854 A1* 7/2014 Freda ............... H04L 1/18
370/329

2015/0085719 A1* 3/2015 Yin ............... H04L 1/1896
370/280

OTHER PUBLICATIONS

Written Opinion of the International Searching Authority issued in corresponding application No. PCT/JP2014/084155 dated Apr. 7, 2015 (3 pages).
3GPP TS 36.300 V12.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 14878953.0, dated Aug. 18, 2017 (8 pages).
Email Rapporteur (CMCC); "Email summary on inter-band TDD CA"; 3GPP TSG RAN WG1 Meeting #68bis, R1-121719; Jeju, Korea, Mar. 26-30, 2012 (24 pages).

* cited by examiner

| UL-DL CONFIGURATION | DL-TO-UL SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 [ms] | D | S | U | U | U | D | S | U | U | U |
| 1 | 5 [ms] | D | S | U | U | D | D | S | U | U | D |
| 2 | 5 [ms] | D | S | U | D | D | D | S | U | D | D |
| 3 | 10 [ms] | D | S | U | U | U | D | D | D | D | D |
| 4 | 10 [ms] | D | S | U | U | D | D | D | D | D | D |
| 5 | 10 [ms] | D | S | U | D | D | D | D | D | D | D |
| 6 | 5 [ms] | D | S | U | U | U | D | S | U | U | D |

FIG.2

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1).

In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Also, successor systems of LTE—referred to as, for example, "LTE-advanced" or "LTE enhancement"—have been studied for the purpose of achieving further broadbandization and increased speed beyond LTE, and the specifications thereof have been drafted as LTE Rel. 10/11 (LTE-A).

As duplex modes for radio communication in LTE systems and LTE-A systems, there are frequency division duplex (FDD) to divide between the uplink (UL) and the downlink (DL) based on frequency, and time division duplex (TDD) to divide between the uplink and the downlink based on time.

Also, the system band of LTE Rel. 10/11 includes at least one component carrier (CC), where the LTE system band constitutes one unit. Such bundling of a plurality of CCs into a wide band is referred to as "carrier aggregation" (CA).

In carrier aggregation (CA) in LTE Rel. 10/11, the duplex modes to employ in a plurality of CCs have to be the same duplex mode. By contrast with this, for example, in carrier aggregation (CA) of future radio communication systems including LTE Rel. 12 and later versions, a plurality of CCs might employ varying duplex modes. Carrier aggregation (CA) of this type will be referred to as "TDD-FDD CA."

In LTE Rel. 12, which is a more advanced successor system of LTE, various scenarios to use a plurality of cells in different frequency bands (carriers) are under study. When the radio base stations to form a plurality of cells are substantially the same, the above-described carrier aggregation (CA) is applicable. When the radio base stations to form a plurality of cells are completely different, dual connectivity (DC) may be employed.

Carrier aggregation (CA) may be referred to as "intra-eNB CA," and dual connectivity may be referred to as "inter-eNB CA."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Using TDD-FDD CA as a basis, there is a possibility that dynamic TDD, which is studied under Rel. 12, is used together. Also, a study is in progress to use a DL-only carrier as a TDD carrier for use in secondary cells (SCCs) in TDD-FDD CA. However, when a DL-only carrier is used in secondary cells (SCCs) in TDD-FDD CA, it is not possible to employ dynamic TDD that is studied under Rel. 12. Furthermore, in the TDD UL-DL configurations that are supported in Rel. 11, the ratio of uplink and downlink subframes that can be selected are limited.

The present invention has been made in view of the above, and it is therefore an object of the present invention to provide a user terminal, a radio base station and a radio communication method to realize dynamic TDD that does not rely on TDD UL-DL configurations that are based on TDD-FDD CA.

Solution to Problem

The user terminal of the present invention provides a user terminal that executes radio communication with a plurality of cells by employing carrier aggregation, and this user terminal has a receiving section that, when a connection is established with a secondary cell serving as a dynamic TDD cell, receives control information, which is transmitted from a primary cell and which includes a dynamic command with respect to a subframe configuration of the dynamic TDD cell, and a control section that decides whether or not one or a plurality of subframes in the dynamic TDD cell are uplink subframes or downlink subframes based on the control information, and, furthermore, controls operations pertaining to the dynamic TDD cell.

Advantageous Effects of Invention

According to the present invention, it is possible to realize dynamic TDD that does not rely on TDD UL-DL configurations that are based on TDD-FDD CA.

BRIEF DESCRIPTION OF DRAWINGS

FIG. 2 is a diagram to explain existing UL-DL configurations;

DESCRIPTION OF EMBODIMENTS

Figure 1A:
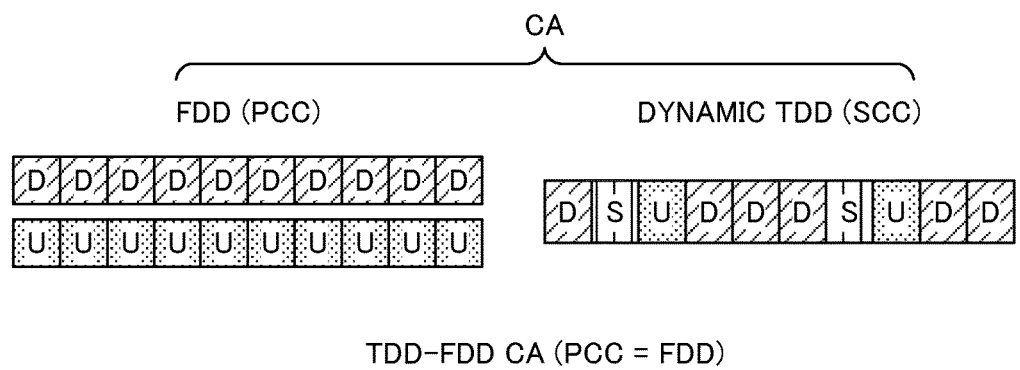
FIG. 1 provide diagrams to explain an overview of TDD-FDD CA.
Figure 1B:
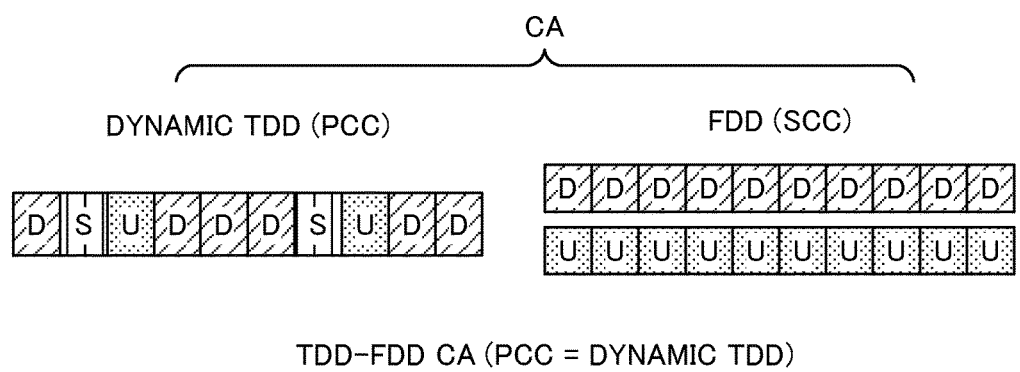

Now, an embodiment of the present invention will be described below in detail with reference to the accompanying drawings. FIG. 1 provide diagrams to explain an overview of TDD-FDD CA. FIG. 1A shows TDD-FDD CA, in which an FDD carrier is used in the primary cell ("PCell," (Primary Cell), "PCC," etc.), and a dynamic TDD carrier is used in the secondary cell ("SCell," (Secondary Cell), "SCC," etc.). FIG. 1B shows TDD-FDD CA, in which a dynamic TDD carrier is used in the primary cell (PCC), and an FDD carrier is used in the secondary cell (SCC). Referring to FIG. 1, "D" stands for DL subframes, "U" stands for UL subframes, and "S" stands for special subframes.

In FDD, DL assignments and UL grants are transmitted in a physical downlink control channel (PDCCH) or in an enhanced physical downlink control channel (EPDCCH) in all DL subframes, and, four [ms] after a downlink shared channel (PDSCH: Physical Downlink Shared Channel) is transmitted in the same subframe, an uplink shared channel (PUSCH: Physical Uplink Shared Channel) is transmitted.

In FDD, a user terminal tries to receive the PDCCH or the EPDCCH in all DL subframes. The user terminal measures channel quality (CQI: Channel Quality Indicator) and received power (RSRP: Reference Signal Received Power) based on the assumption that reference signals are transmitted in all DL subframes.

In TDD, the DL subframes to transmit DL assignments and UL grants vary depending on UL-DL configurations, and are limited to specific subframes. As for the UL-DL configurations, to be more specific, seven frame configurations with varying transmission ratios of UL subframes and DL subframes, namely UL-DL configurations #0 to #6, are provided (see FIG. 2). In TDD, the timing to transmit the PDSCH or the PUSCH also varies per UL-DL configuration and subframe number.

In TDD, a user terminal tries to receive the PDCCH or the EPDCCH in specific DL subframes, based on the UL-DL configuration and the special subframe configuration configured. The user terminal assumes that reference signals are transmitted in specific DL subframes, and measures channel quality (CQI), received power (RSRP) and so on based on the UL-DL configuration and the special subframe configuration configured.

In Rel. 12, dynamic TDD (or Rel. 12 eIMTA (enhanced Interference Management and Traffic Adaptation)) to dynamically switch the TDD frame configuration depending on uplink and downlink traffic by switching existing UL-DL configurations dynamically, is under study. For cases in which Rel. 12 dynamic TDD is employed, a study in progress to use semi-static HARQ timings in order to prevent the timing to execute retransmission control (HARQ: Hybrid Automatic Repeat Request) from switching dynamically due to dynamic changes of frame configurations. That is, Rel. 12 dynamic TDD ensures adequate timings for transmitting control information by making the HARQ timing independent from dynamic switching of UL-DL configurations. As for the HARQ transmission timing, for example, there is an ongoing discussion to follow the SIB1 TDD UL-DL configuration on the uplink, and make selections from the Rel. 8 TDD UL-DL configurations {2, 4, 5} on the uplink.

Consequently, when cross-carrier scheduling is executed in TDD-FDD CA, the possibility is high that Rel. 12 dynamic TDD can be supported even if an FDD carrier or a TDD carrier is used in the primary cell (PCC), by placing the HARQ timing in compliance with the above-noted rules.

Generally, macro cells more often operate in FDD, so that, in TDD-FDD CA, an FDD carrier is more likely to be used in the primary cell (PCC). In this case, if the TDD band is used in the secondary cells (SCCs), a DL-only carrier, which limits the TDD carrier to use for the secondary cells (SCCs) to the downlink alone, is under study, in order to support the downlink traffic, where the volume of communication is heavy compared to the uplink traffic.

The DL-only carrier stipulates one configuration from: (1) ten DL subframes; (2) nine DL subframes and one non-UL subframe; and (3) eight DL subframes and two non-UL subframes, as a new UL-DL configuration in TDD.

The non-UL subframes in above (2) or (3) refer to subframes that do not include UL symbols apart from the uplink pilot time slot (UpPTS) of special subframes. For example, it is possible to use subframes in which part or all of the symbols are made blank and the rest of the symbols are made DL symbols, or use special subframes.

Unlike existing UL-DL configurations, a DL-only carrier has no UL subframe present therein, and therefore is presumed for use as a secondary cell (SCC) in carrier aggregation (CA).

Meanwhile, given that, in an environment where there are a small number of users such as a small cell, cases might occur where the uplink traffic increases in bursts, so that it is preferable if the ratio of UL subframes and DL subframes can be changed by means of dynamic TDD.

However, when a DL-only carrier is applied to the secondary cells (SCCs), Rel. 12 dynamic TDD cannot be employed. In Rel. 12 dynamic TDD, UL subframes are switched to DL subframes, dynamically, based on the UL-DL configuration that is reported in SIB1 (System Information Block Type 1). Here, in order to secure backward compatibility, it is not allowed to change DL subframes or special subframes to UL subframes.

Meanwhile, when a user terminal that is incapable of uplink carrier aggregation (UL CA) tries to connect with CCs that employ Rel. 12 dynamic TDD, it is preferable to handle these CCs as a DL-only carrier.

Consequently, when employing Rel. 12 dynamic TDD, some kind of specification is required. Then, since UL subframes are always included in Rel. 8 TDD UL-DL configurations, some UL subframes remain as long as Rel. 12 dynamic TDD is employed. Also, Rel. 12 dynamic TDD is subject to limited HARQ timings, and therefore significant delays are produced.

The present inventors have found out a method of implementing enhanced dynamic TDD that is based upon TDD-FDD CA. Now, the uplink and downlink subframe configuration methods for implementing TDD-FDD CA-based enhanced dynamic TDD will be described below.

First Example

Figure 3:
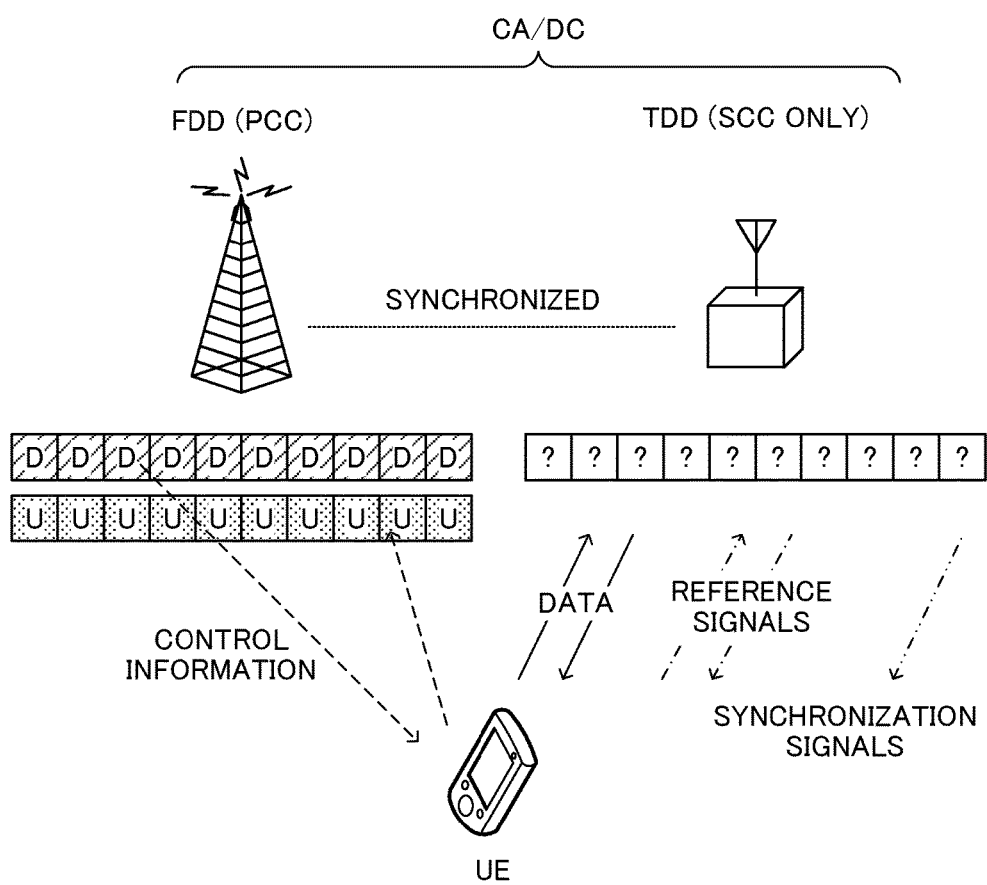
FIG. 3 is a diagram to explain an overview of enhanced dynamic TDD that is based on TDD-FDD CA, according to a first embodiment.

FIG. 3 is a diagram to explain an overview of TDD-FDD CA-based enhanced dynamic TDD. Enhanced dynamic TDD may be thought of as dynamic TDD that is not limited by the UL-DL configuration—that is, configuration-free.

In the configuration according to a first example, carrier aggregation (CA) or dual connectivity (DC) may define the relationship between the primary cell (PCC) and the secondary cell (SCC). A case to employ carrier aggregation (CA) will be illustrated in the following description as an example.

In TDD-FDD CA, if dynamic TDD is designed based upon the premise that the FDD carrier is used in the primary cell (PCC), there are always DL subframes and UL subframe that can transmit and receive control information in the primary cell (PCC).

Consequently, as shown in FIG. 3, by transmitting and receiving control information for the dynamic TDD carrier for use for the secondary cell (SCC) in the primary cell (PCC), it becomes possible to implement enhanced dynamic TDD that is more flexible than Rel. 12 dynamic TDD. By transmitting all types of control information using the primary cell (PCC), for example, it becomes possible to make the transmission and reception of all signals for the secondary cell (SCC) such as data signals, reference signals, synchronization signals and so on dynamically changeable with high flexibility.

In the secondary cell (SCC), a TDD-based carrier, which uses the uplink and the downlink in time division, is configured in user terminals. This TDD-based carrier does not configure specific UL-DL configurations and special subframe configuration as in existing TDD, and, instead, user terminals identify between UL subframes and DL subframes based on dynamic commands from the primary cell (PCC). The user terminals may see subframes where no command to designate UL subframes or DL subframes is received as DL subframes.

To be more specific, the primary cell (PCC) reports to the user terminals whether one or a plurality of subframes in the secondary cell (SCC) are UL subframe or DL subframes, through MAC layer or physical layer signaling. Consequently, it is not necessary to report the UL subframes or DL subframe in the TDD carrier to the user terminals in advance by using specific UL-DL configuration information and so on. The relationship between DL assignments and the PDSCH or between UL grants and the PUSCH in terms of their timings may be the same as in FDD, or it is equally to employ other fixed timing relationships and send a report by using higher layer signaling such as RRC signaling, broadcast signals and so on.

By employing this configuration, enhanced dynamic TDD can realize a subframe configuration that is not possible with Rel. 12 dynamic TDD that uses existing UL-DL configurations. This subframe configuration is, for example, the kind of configuration in which DL subframes are configured continuously and then switch to UL subframes several frames later.

Based on commands from the primary cell (PCC), the user terminals perform measurements in the secondary cell (SCC), CSI (Channel State Information) measurements in the secondary cell (SCC), DL reception including search spaces, control channels, data channels, discovery signals and so on in the secondary cell (SCC), RACH (Random Access Channel) transmission in the secondary cell (SCC), UL transmission in the secondary cell (SCC), UCI (Uplink Control Information) feedback in the secondary cell (SCC), and sounding in the secondary cell (SCC) and so on.

By commanding these from the primary cell (PCC) to the user terminals, it is possible to control the user terminals in a reliable manner. If a user terminal moves, the connecting secondary cell (SCC) changes following this. Consequently, compared to the case where control signals are transmitted from the secondary cell (SCC), it is possible to secure better quality by transmitting control signals from the primary cell (PCC).

For example, the primary cell (PCC) may use a licensed band that is allocated to the operator, and the secondary cell (SCC) may either use a licensed band or use an unlicensed band that, for example, is used in a wireless LAN in compliance with IEEE 802.11 series.

Figure 4A:
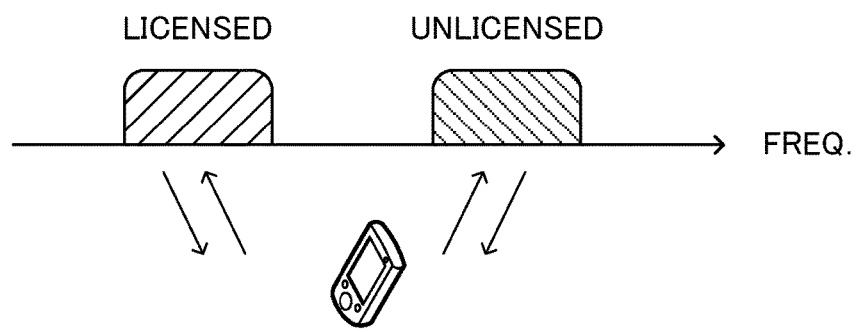
FIG. 4 provide diagrams to explain LTE-U, which uses unlicensed bands in LTE, according to the first embodiment.
Figure 4B:
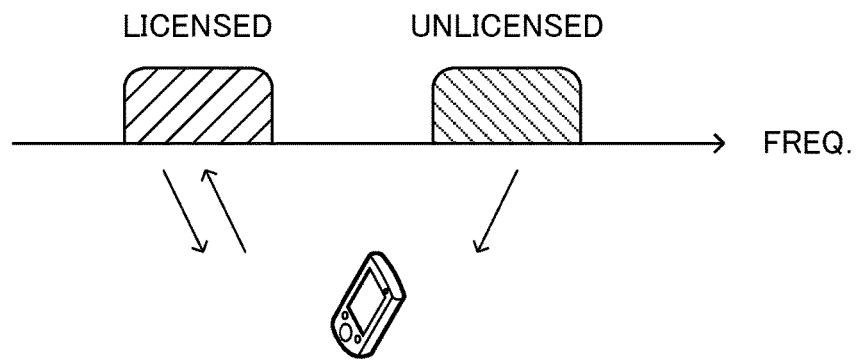
Figure 4C:
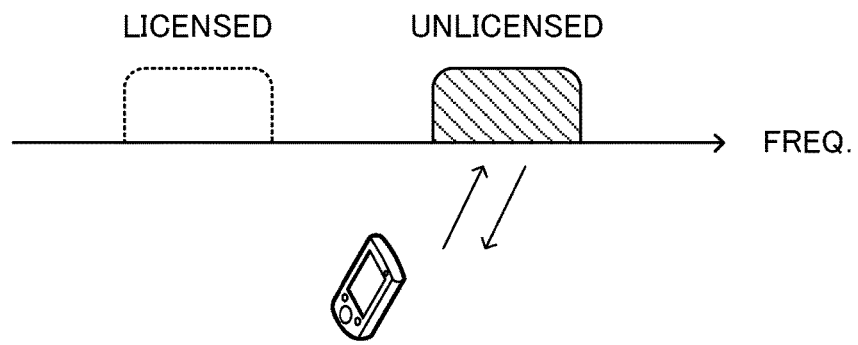

In relationship to unlicensed bands, LTE-U (Unlicensed) to use unlicensed bands in LTE has been proposed. FIG. 4 shows three modes of use of unlicensed bands. To be more specific, FIG. 4A shows carrier aggregation (CA) or dual connectivity (DC) mode, FIG. 4B shows supplemental downlink (SDL) mode, and FIG. 4C shows stand-alone mode. Among these, carrier aggregation (CA) mode and supplemental downlink (SDL) mode are both designed so that unlicensed bands are used in secondary cells (SCCs) by using LTE carrier aggregation (CA). There is a possibility that an EPUSCH to use OFDMA is used as a radio access scheme in unlicensed bands, instead of a PUSCH that uses SC-FDMA.

When TDD-FDD CA and an unlicensed band are combined and control information is transmitted in the unlicensed band, the quality of the control signals lowers because of the need to prevent collisions with other systems, and, furthermore, transmission opportunities are not secured either. By contrast with this, according to the first example, control information is transmitted in a licensed band, so that it is possible to secure the reliability of control information even when TDD-FDD CA and an unlicensed band are combined.

Also, since the function for providing support for CCs of unlicensed bands can be kept minimal by combining TDD-FDD CA and unlicensed bands, it is possible to reduce the cost of the system. Note that, from the perspective of cost reduction, an approach to adopt a simple control to confine CCs of unlicensed bands to CCs as much as possible may be possible. However, in this case, the operation of CCs of unlicensed bands becomes similar to stand-alone operation, it becomes difficult to heighten the level of interference coordination and so on.

When TDD-FDD CA and an unlicensed band are combined and the primary cell (PCC) is made to use FDD, it becomes possible to transmit and receive control information at arbitrary timings.

In an unlicensed band, there is a possibility that strong interference comes from other systems in all timings, so that, by combining dynamic TDD with the unlicensed band, it becomes possible to reduce the impact of inter-radio base station interference in dynamic TDD relatively low.

Also, cases might occur with licensed bands where a limitation is placed on the application of dynamic TDD in order to prevent interference against neighboring bands. On the other hand, although the transmission power is limited in unlicensed bands, no limitation is placed on the application of dynamic TDD. Consequently, by combining dynamic TDD and unlicensed bands, it becomes possible to allocate maximal UL resources or DL resources in accordance with traffic.

In both cases where TDD-FDD CA and an unlicensed band are combined and where dynamic TDD and an unlicensed band are combined, LTE in the unlicensed band makes use of a non-backward compatible carrier, so that enhancement is allowed on a higher level.

Second Example

With a second example, a method of switching between DL communication and UL communication in a TDD carrier to implement TDD-FDD CA-based enhanced dynamic TDD according to the first example will be described. When DL communication and UL communication are switched in TDD communication, the guard period (GP) is used as the interval for switching between DL communication and UL communication.

As a first method of switching between DL communication and UL communication in enhanced dynamic TDD, special subframes or similar signal configurations are used to provide switching intervals. These subframes or signal configurations will be hereinafter also referred to as "switching subframes."

Figure 5:
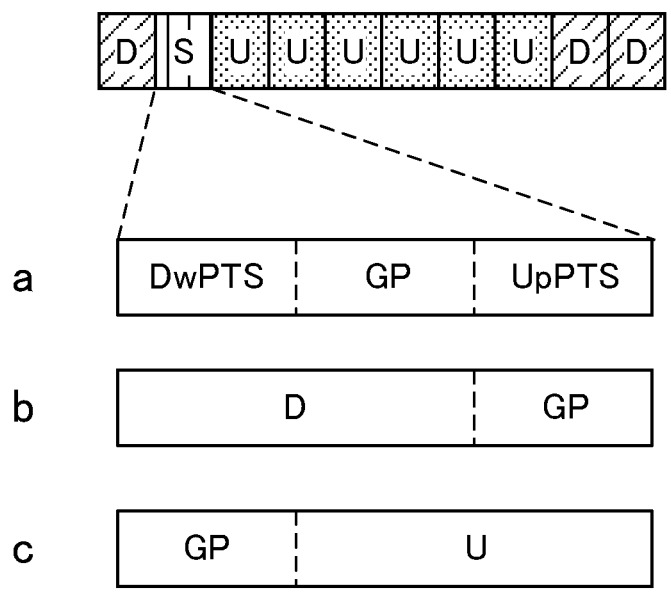
FIG. 5 is a diagram to explain an overview of a switching subframe according to a second embodiment.

FIG. 5 is a diagram to explain an overview of switching subframes. (a) in FIG. 5 is a special subframe, and (b) and (c) are signal configurations to resemble special subframes. As shown with (a) in FIG. 5, a special subframe is comprised of a downlink pilot time slot (DwPTS) and an uplink pilot time slot (UpPTS) that are separated by a guard period (GP). (b) in FIG. 5 shows a signal configuration in which several symbols at the end of a DL subframe are made subject to non-transmission. (c) in FIG. 5 shows a signal configuration in which several symbols at the top of a UL subframe are made subject to non-transmission.

In any of the cases shown as (a) to (c) in FIG. 5, the length of the guard period (GP) can be changed by way of signaling. The switching subframe configurations to include a guard period (GP) may be reported from the primary cell (PCC) to user terminals by using the PDCCH or the EPDCCH, may be reported by using higher layers including RRC (Radio Resource Control) broadcast signals, or may be reported by combining these.

The switching subframes are reported to the user terminals either through reporting by signaling or through implicit reporting, or reported by the combination of these. When reporting by signaling and implicit reporting are combined, the operation may be designed so that the user terminals, when unable to detect signaling, operate based on implicit reporting instead.

First, reporting by way of signaling will be described. By executing signaling to designate a given subframe a switching subframe, the primary cell (PCC) reports the switching subframe to a user terminal. This signaling may be reported by using the PDCCH or the EPDCCH, may be reported by using higher layers including RRC broadcast signals, or may be reported by combining these.

The signaling to designate the switching subframe may be included in DCI (Downlink Control Information) that reports the DL scheduling of the switching subframe or the subframe that is one subframe earlier, or that reports the UL scheduling of the subframe that comes one subframe later.

The signaling to designate the switching subframe may include a trigger to make the user terminal transmit a sounding reference signal (SRS). For example, the SRS may be transmitted in the same subframe as the switching subframe, or the SRS may be transmitted one subframe later or in a UL subframe within a certain period of time. In this case, the user terminal may operate not to handle the next subframe of the switching subframe as a DL subframe. Alternatively, the user terminal may operate to handle the next subframe of the switching subframe as a UL subframe.

Next, implicit reporting of switching subframes will be described. By reporting switching subframes to a user terminal implicitly, it is possible to reduce the signaling overhead.

When identifying a switch from a DL subframe to a UL subframe, the user terminal identifies a given subframe as the switching subframe. Which subframe is to be identified as the switching subframe may be stipulated in the operation of the user terminal, may be reported from the primary cell (PCC) to the user terminal by using the PDCCH or the EPDCCH, may be reported by using higher layers including RRC broadcast signals, or may be reported by combining these.

For example, if the user terminal identifies a specific subframe as a UL subframe in advance based on a designation in a UL grant and the subframe that is one subframe earlier is not a UL subframe, the user terminal may identify the subframe that is one subframe earlier or that UL subframe as a switching subframe. If this UL subframe is identified as a switching subframe, this UL subframe matches the case of use in a signal configuration to make several symbols at the top of a subframe subject to non-transmission, as shown with (c) in FIG. 5. Alternatively, only when the user terminal identifies a specific subframe as an UL subframe based on a designation in a UL grant and the subframe that is one subframe earlier is a DL subframe, may the user terminal identify the subframe that is one subframe earlier or that UL subframe as a switching subframe.

It is also possible to change the transmission timings of both UL grants and DL assignments or one of these and allow the user terminal to identify the switching. For example, when a DL assignment is transmitted four subframes before a subframe in which the PDSCH is transmitted and a UL grant is transmitted five subframes before a subframe in which the PUSCH is transmitted, the user terminal can implicitly detect the switch of DL and UL four subframes earlier.

The user terminal may assume semi-persistent scheduling, or may handle one subframe in periodic UL transmission as a DL subframe.

Figure 6:
FIG. 6 is a diagram to explain an overview of a switching subframe according to the second embodiment.

In a second method of switching DL communication and UL communication in enhanced dynamic TDD, as shown in FIG. 6, at the timing to switch between DL communication and UL communication, one subframe before a UL subframe is made blank. In this case, this one blank subframe serves as a switching interval. The user terminal transmits no signals in this subframe. This configuration is allowed if the frequency to switch between DL communication and UL communication is low.

Figure 7:
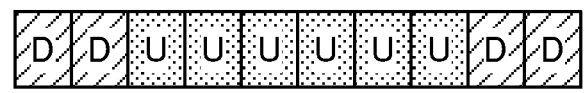
FIG. 7 is a diagram to explain an overview of a switching subframe according to the second embodiment.

In a third method of switching DL communication and UL communication in enhanced dynamic TDD, no switching interval is provided in particular, and, as shown in FIG. 7, DL subframes and UL subframes are arranged in a continuous manner.

Third Example

Support for user terminals that do not support UL carrier aggregation (CA) in the configuration to use TDD-FDD CA-based enhanced dynamic TDD according to the first example will be described with a third example.

Figure 8A:
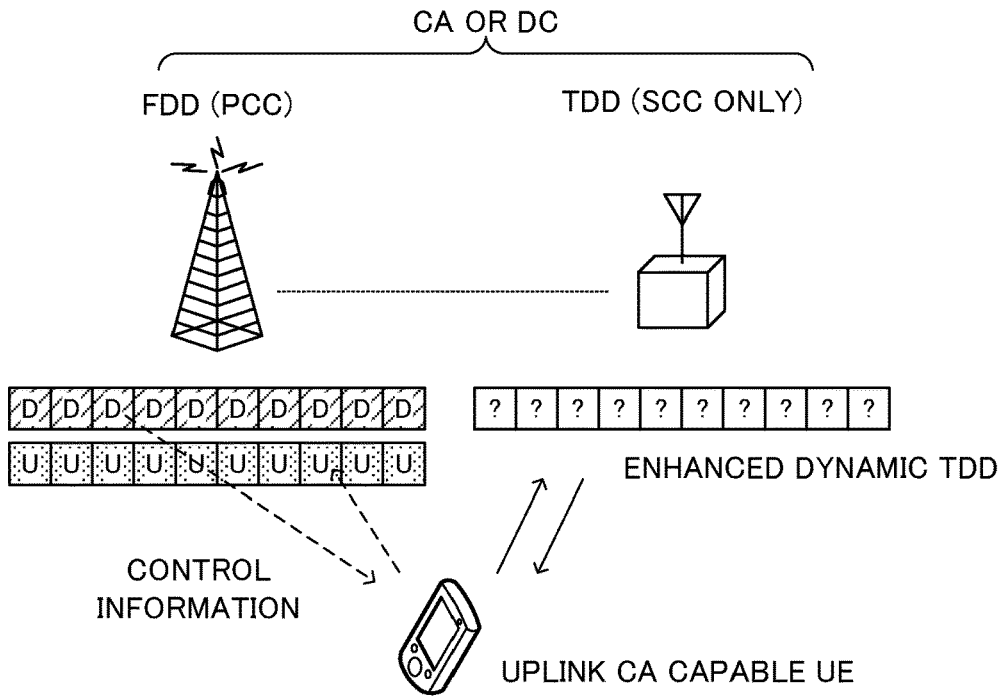
FIG. 8 provide diagrams to explain TDD configurations for a user terminal that supports UL carrier aggregation (CA) or a user terminal that does not support UL carrier aggregation (CA), according to a third embodiment.

In TDD-FDD CA according to the first example, when UL subframes are present in both the FDD carrier of the primary cell (PCC) and the enhanced dynamic TDD carrier of the secondary cell (SCC), a user terminal has to support UL carrier aggregation (CA) (see FIG. 8A). However, there are user terminals that do not support UL carrier aggregation (CA).

Figure 8B:
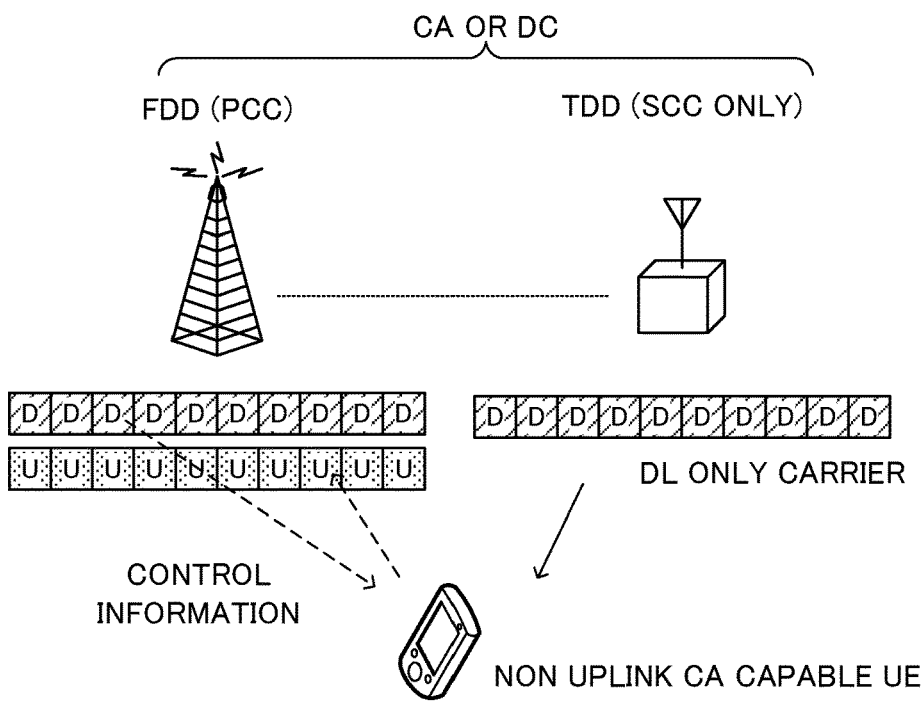

It is possible to allow even user terminals that do not support UL carrier aggregation (CA) to make use of the secondary cell (SCC), by scheduling DL subframes alone in enhanced dynamic TDD. For example, it is possible to send a DL-only carrier, as a TDD configuration for user terminals that do not support UL carrier aggregation (CA), by signaling (see FIG. 8B). This signaling may be sent using higher layer signaling of the primary cell (PCC) including RRC signaling, broadcast signals and so on, or may be sent using higher layer signaling of the secondary cell (SCC) including RRC signaling, broadcast signals and so on. User terminals that support UL carrier aggregation (CA) can disregard this signaling.

In this case, too, scheduling of the user terminals is carried out in the primary cell (PCC) by way of cross-carrier scheduling.

It is equally possible to designate a subframe from the primary cell (PCC) and send by way of signaling a trigger to make the user terminals perform the receiving operation or a dynamic DRX (Discontinuous Reception) trigger to make the user terminals not perform the receiving operation. The user terminals behave not to perform the receiving operation in UL subframes following this signaling. This may be reported from the primary cell (PCC) to the user terminals by signaling using the PDCCH or the EPDCCH, may be reported by signaling using higher layers including RRC broadcast signals, or may be reported by signaling combining these.

Also, for user terminals that do not support UL carrier aggregation (CA), existing UL-DL configuration may be used instead of the above-noted DL-only carrier. For example, the primary cell (PCC) sends signaling so that user terminals that do not support UL carrier aggregation (CA) identify the dynamic TDD CA carrier as UL-DL configuration #5 (see FIG. 2). Assume that, in this case, user terminals that do not support UL carrier aggregation (CA) do not perform the uplink signal transmission operation in the TDD carrier's UL subframes.

Fourth Example

Application of the configuration to use TDD-FDD CA-based enhanced dynamic TDD according to the first example to D2D (Device to Device) technology will be described with a fourth example.

Figure 9:
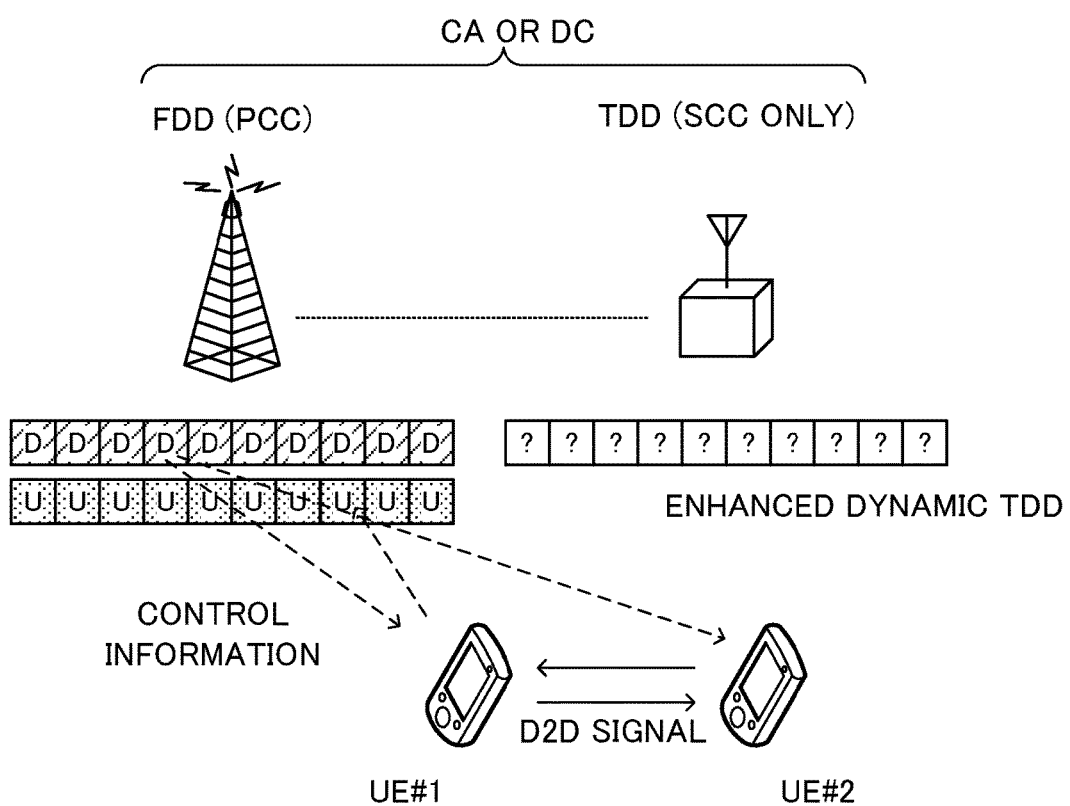
FIG. 9 is a diagram to explain application to D2D technology, according to a fourth embodiment.

A user terminal can operate to receive D2D signals even in subframes that are not DL subframes. Assume that D2D signals refer to all signals used in D2D communication, including D2D discovery, D2D synchronization and D2D data channels, or combinations of any of these signals. Subframes that are not DL subframes refer to UL subframes or subframes where there is no UL or DL signaling. In the example shown in FIG. 9, a user terminal UE #1 receives a D2D signal that is transmitted from a user terminal UE #2 in a subframe that is not a DL subframe.

The primary cell (PCC) may report the subframes to receive D2D signals to the user terminals. This may be reported from the primary cell (PCC) to the user terminals by using the PDCCH or the EPDCCH, may be reported by using higher layers including RRC broadcast signals, or may be reported by combining these. Alternatively, the user terminals' operation may be designed so that detection of reception of D2D signals is carried out in subframes other than the subframes DL subframes are reported.

In UL subframes, the user terminals may transmit D2D signals by using an enhanced dynamic TDD carrier by signaling from the primary cell (PCC). In the example shown in FIG. 9, user terminal UE #1 transmits a D2D signal to user terminal UE #2 in a UL subframe.

In TDD-FDD CA according to the first example, even user terminals that do not support UL carrier aggregation (CA) can transmit D2D signals by using an enhanced dynamic TDD carrier in timings other than the timings to transmit uplink signals to the primary cell (PCC).

As described above, it is possible to transmit and receive D2D signals by using the enhanced dynamic TDD carrier of the first example that is based on TDD-FDD CA.

(Structure of Radio Communication System)

Now, a structure of a radio communication system according to the present embodiment will be described below. In this radio communication system, the above-described radio communication methods according to the first example to the fourth examples are employed.

Figure 10:
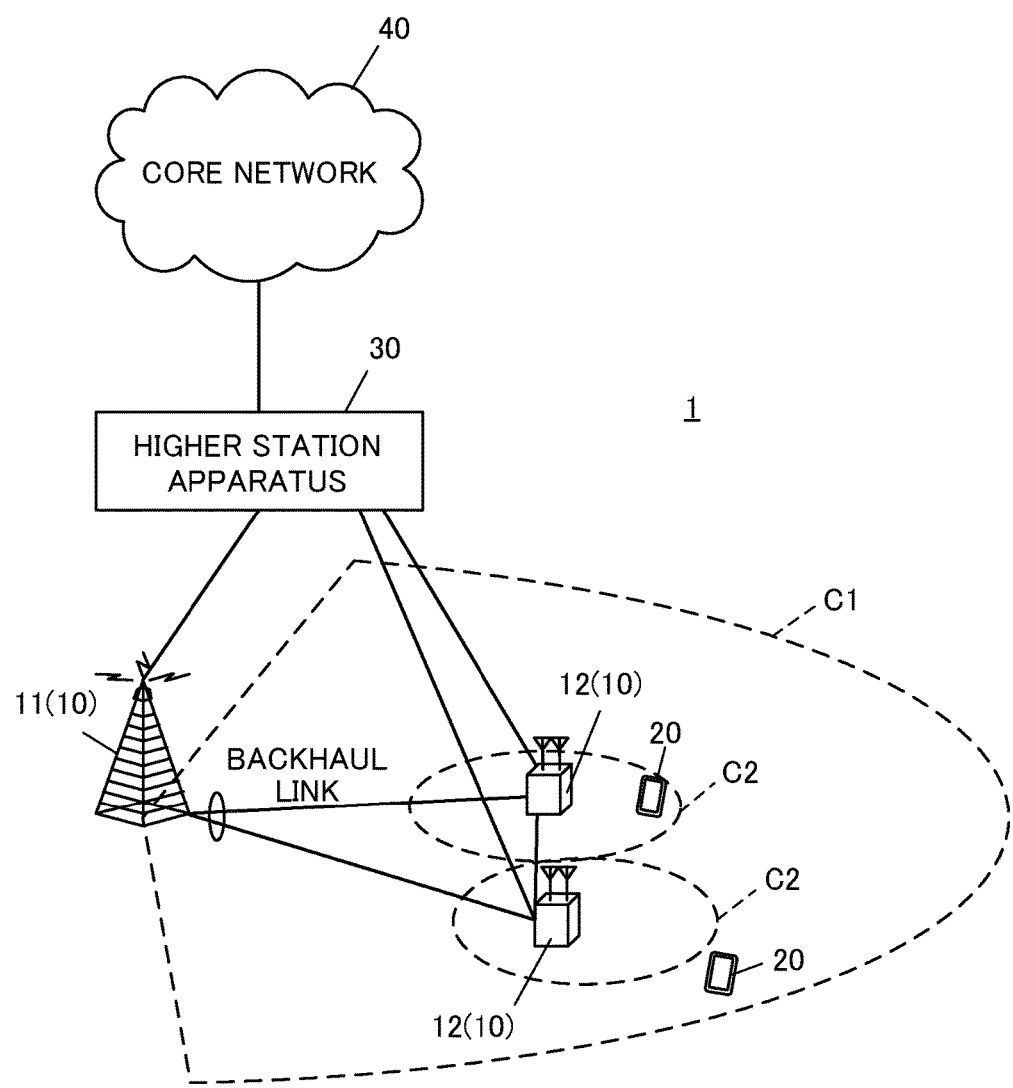
FIG. 10 is a diagram to show an example of a schematic structure of a radio communication system according to the present embodiment.

FIG. 10 is a schematic structure diagram to show an example of the radio communication system according to the present embodiment. As shown in FIG. 10, a radio communication system 1 is comprised of a plurality of radio base stations 10 (11 and 12), and a plurality of user terminals 20 that are present within cells formed by each radio base station 10, and that are configured to be capable of communicating with each radio base station 10. The radio base stations 10 are each connected with a higher station apparatus 30, and are connected to a core network 40 via the higher station apparatus 30.

In FIG. 10, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 10.

In the macro cell C1 and the small cells C2, the same frequency band may be used, or different frequency bands may be used. Also, the macro base stations 11 and 12 are connected with each other via an inter-base station interface (for example, optical fiber, the X2 interface, etc.).

Between the radio base station 11 and the radio base stations 12, between the radio base station 11 and other radio base stations 11, or between the radio base stations 12 and other radio base stations 12, dual connectivity mode (DC) or carrier aggregation (CA) is employed.

User terminals 20 are terminals to support various communication schemes such as LTE, LTE-A and so on, and may include both mobile communication terminals and stationary communication terminals. The user terminals 20 can communicate with other user terminals 20 via the radio base stations 10.

Note that the higher station apparatus 30 may be, for example, an access gateway apparatus, a radio network controller (RNC), a mobility management entity (MME) and so on, but is by no means limited to these.

In the radio communication system 1, a downlink shared channel (PDSCH: Physical Downlink Shared Channel), which is used by each user terminal 20 on a shared basis, downlink control channels (PDCCH (Physical Downlink Control Channel), EPDCCH (Enhanced Physical Downlink Control Channel), etc.), a broadcast channel (PBCH) and so on are used as downlink channels. User data, higher layer control information and predetermined SIBs (System Information Blocks) are communicated in the PDSCH. Downlink control information (DCI) is communicated in the PDCCH and the EPDCCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel) and so on are used as uplink channels. User data and higher layer control information are communicated in the PUSCH.

Figure 11:
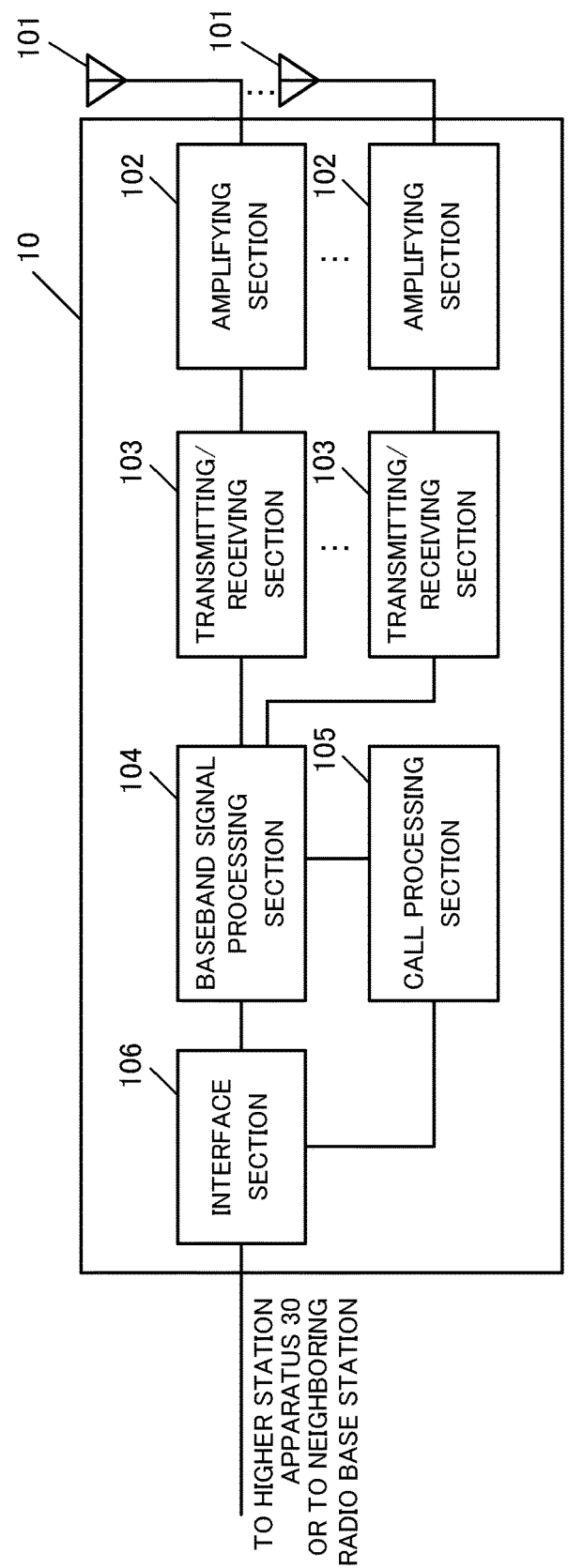
FIG. 11 is a diagram to explain an example of an overall structure of a radio base station according to the present embodiment.

FIG. 11 is a diagram to show an overall structure of a radio base station 10 according to the present embodiment. The radio base station 10 has a plurality of transmitting/receiving antennas 101 for MIMO communication, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control signals are also subjected to transmission processes such as channel coding and an inverse fast Fourier transform, and forwarded to each transmitting/receiving section 103.

The baseband signal processing section 104 reports control information for allowing the user terminal 20 to communicate in the cell, via MAC layer signaling, physical layer signaling or higher layer signaling including RRC signaling. This control information includes, for example, information about the DL subframe and UL subframe configurations that are used in an enhanced dynamic TDD cell.

Each transmitting/receiving section 103 converts the downlink signal, pre-coded and output from the baseband signal processing section 104 on a per antenna basis, into a radio frequency band. The amplifying sections 102 amplify the radio frequency signals having been subjected to frequency conversion, and transmit the resulting signals through the transmitting/receiving antennas 101.

On the other hand, as for uplink signals, radio frequency signals that are received in the transmitting/receiving antennas 101 are each amplified in the amplifying sections 102, converted into the baseband signal through frequency conversion in each transmitting/receiving section 103, and input into the baseband signal processing section 104.

Each transmitting/receiving section 103 functions as a transmission section that transmits control information, including information about the DL subframe and UL subframe configurations to use in an enhanced dynamic TDD cell, by MAC layer signaling.

In the baseband signal processing section 104, the user data that is included in the input uplink signals is subjected to an FFT process, an IDFT process, error correction decoding, a MAC retransmission control receiving process, and RLC layer and PDCP layer receiving processes, and the result is forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 12:
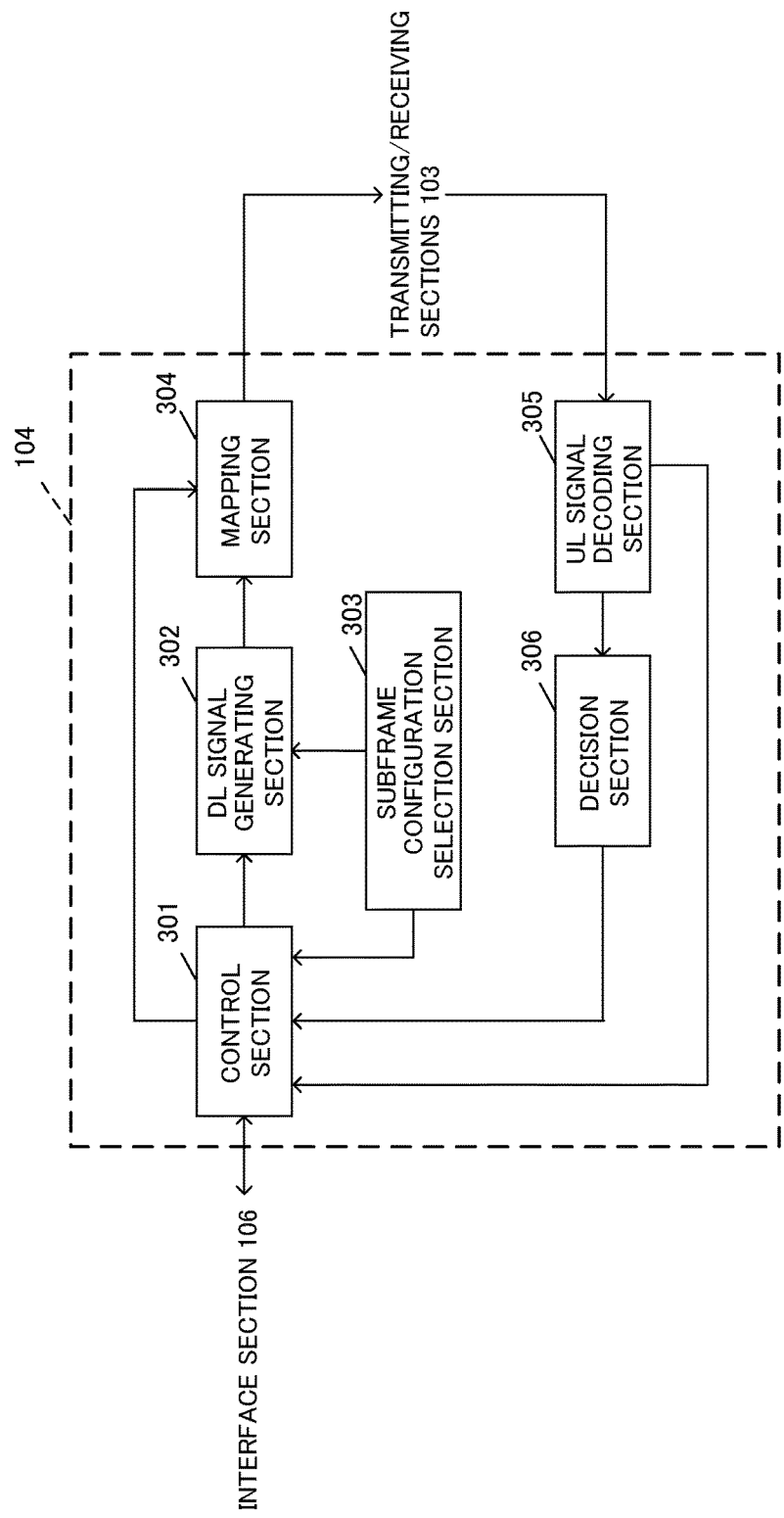
FIG. 12 is a diagram to explain an example of a functional structure of a radio base station according to the present embodiment.

FIG. 12 is a diagram to show a principle functional structure of the baseband signal processing section 104 provided in the radio base station 10 according to the present embodiment. As shown in FIG. 12, the baseband signal processing section 104 provided in the radio base station 10 is comprised at least of a control section 301, a DL signal generating section 302, a subframe configuration selection section 303, a mapping section 304, a UL signal decoding section 305 and a decision section 306.

The control section 301 controls the scheduling of downlink user data that is transmitted in the PDSCH, downlink control information that is transmitted in one or both of the PDCCH and the enhanced PDCCH (EPDCCH), downlink reference signals and so on. Also, the control section 301 also controls the scheduling of RA preambles that are transmitted in the PRACH, uplink data that is transmitted in the PUSCH, uplink control information that is transmitted in the PUCCH or the PUSCH, and uplink reference signals (allocation control). Information about the allocation control of uplink signals (uplink control signals, uplink user data, etc.) is reported to the user terminal 20 by using downlink control signals (DCI).

The control section 301 controls the allocation of radio resources to downlink signals and uplink signals based on command information from the higher station apparatus 30, feedback information from each user terminal 20 and so on. That is, the control section 301 functions as a scheduler.

When the user terminals 20 connects with a TDD carrier of a secondary cell (SCC), the control section 301 controls the allocation of DL signals and UL signals to each subframe based on the DL subframe and UL subframe configurations selected in the subframe configuration selection section 303.

The DL signal generating section 302 generates the downlink control signals and downlink data signals that are determined to be allocated in the control section 301. To be more specific, the DL signal generating section 302 generates DL assignments, which report the allocation of DL signals, and UL grants, which report the allocation of UL signals, based on commands from the control section 301. Also, the DL signal generating section 302 generates information about the subframe configurations selected in the subframe configuration selection section 303.

The subframe configuration selection section 303 selects the subframe configurations to use in enhanced dynamic TDD of the secondary cell taking into account traffic and so on.

The mapping section 304 controls the allocation of the downlink control signals and the downlink data signals generated in the DL signal generating section 302 to radio resources based on commands from the control section 301.

The UL signal decoding section 305 decodes the feedback signals such as delivery acknowledgement signals transmitted from the user terminals in the uplink control channel and outputs the results to the control section 301. The uplink data signal decoding section 308 decodes the uplink data signals transmitted from the user terminals in the uplink shared channel (PUSCH), and outputs the results to the decision section 309.

The decision section 306 makes retransmission control decisions based on the decoding results in the UL signal decoding section 305 and outputs the decisions to the control section 301.

Figure 13:
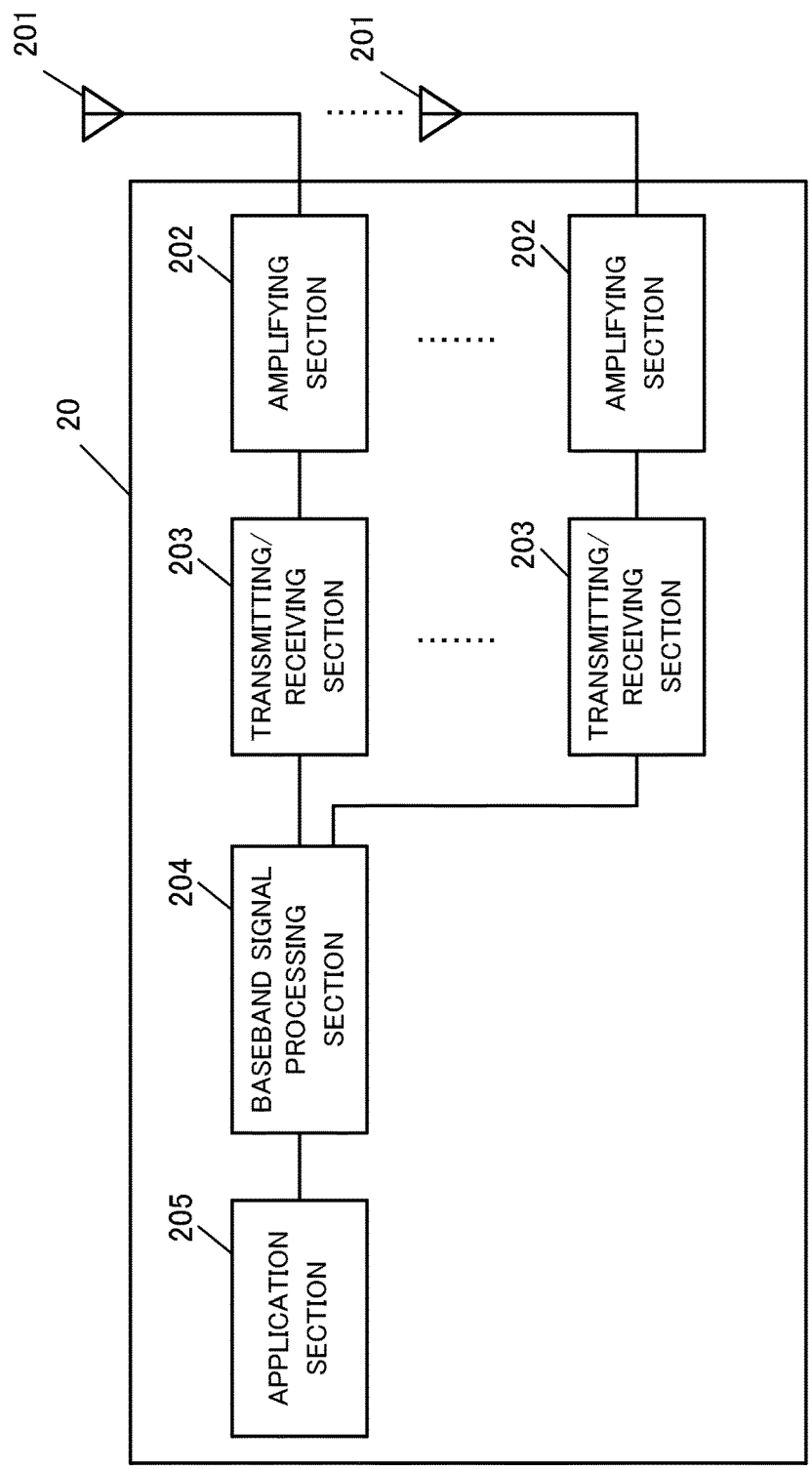
FIG. 13 is a diagram to explain an example of an overall structure of a user terminal according to the present embodiment.

FIG. 13 is a diagram to show an overall structure of a user terminal 20 according to the present embodiment. As shown in FIG. 13, the user terminal 20 has a plurality of transmitting/receiving antennas 201 for MIMO communication, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. In the baseband signal processing section 204, a retransmission control (HARQ: Hybrid ARQ) transmission process, channel coding, precoding, a DFT process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signal having been subjected to frequency conversion, and transmit the resulting signal from the transmitting/receiving antennas 201.

When the user terminal 20 connects with an enhanced dynamic TDD cell being a secondary cell, the transmitting/receiving sections 203 function as receiving sections to receive control information including dynamic commands for the dynamic TDD cell's subframe configuration, transmitted from the primary cell.

Figure 14:
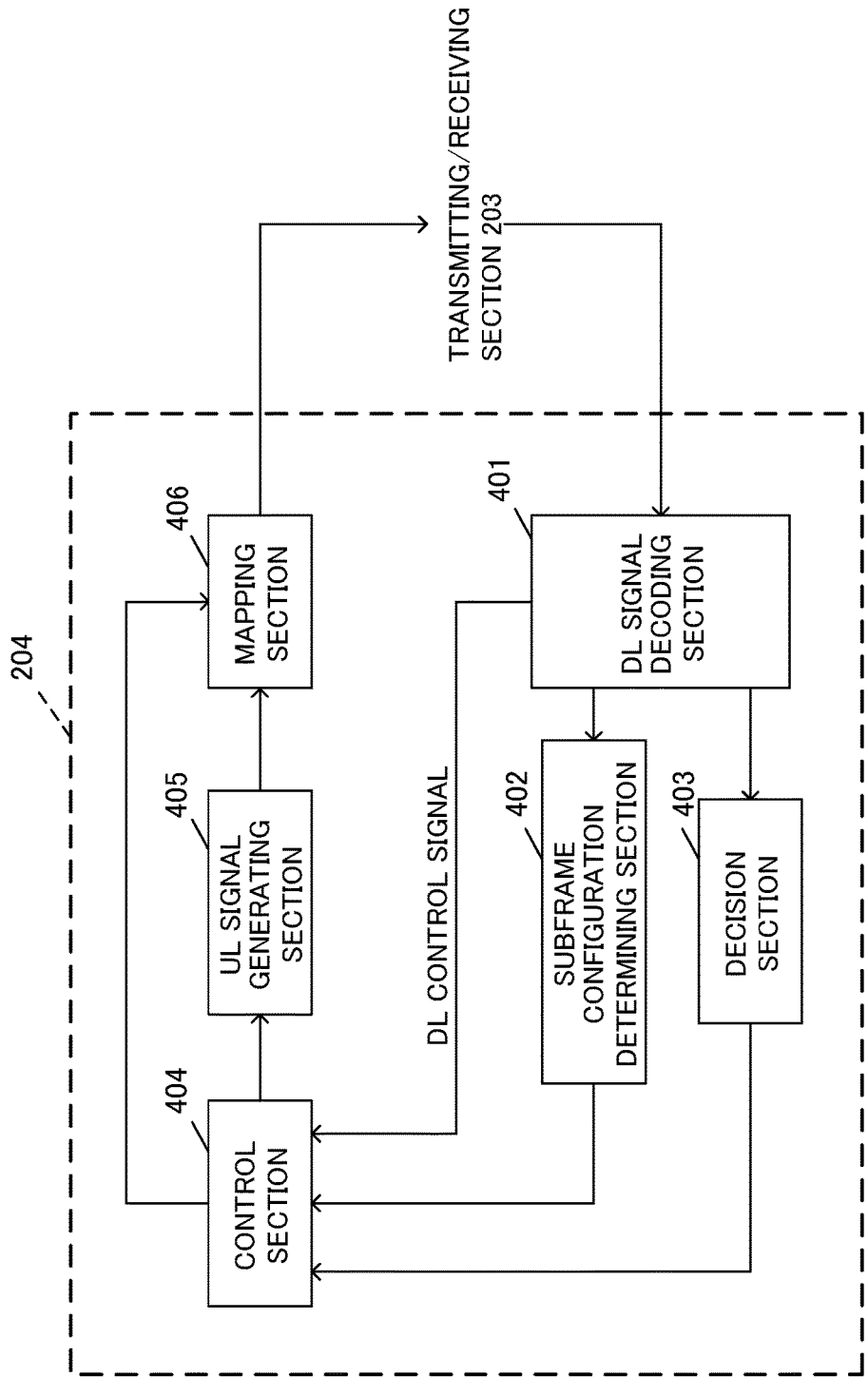
FIG. 14 is a diagram to explain an example of a functional structure of a user terminal according to the present embodiment.

FIG. 14 is a principle functional structure diagram of the baseband signal processing section 204 provided in a user terminal 20. As shown in FIG. 14, the baseband signal processing section 204 provided in the user terminal 20 is comprised at least of a DL signal decoding section 401, a subframe configuration determining section 402, a decision section 403, a control section 404, a UL signal generating section 405 and a mapping section 406.

The DL signal decoding section 401 decodes the downlink control signals transmitted in the downlink control channel, and outputs the scheduling information to the control section 404. The DL signal decoding section 401 decodes the downlink data signals transmitted in the downlink shared channel, and outputs the results to the decision section 403.

The decision section 403 makes retransmission control decisions based on the decoding results yielded in the DL signal decoding section 401, and, furthermore, outputs the decisions to the control section 404.

The subframe configuration determining section 402 identifies control information related to the DL subframes and UL subframes of the enhanced dynamic TDD cell being a secondary cell, reported from the primary cell (the radio base station 10). The subframe configuration determining section 402 outputs the information about the enhanced dynamic TDD cell's DL subframes and UL subframes to the control section 404.

The control section 404 controls the generation of uplink control signals (A/N signals, etc.), uplink data signals and so on based on the downlink control signals (PDCCH signals) transmitted from radio base station 10, retransmission control decisions in response to the PDSCH signals received, and so on. The downlink control signals received from the radio base station are output from the downlink control signal decoding section 408, and the retransmission control decisions are output from the decision section 409.

The control section 404 controls the transmission of uplink control signals and uplink data signals based on the information about the enhanced dynamic TDD cell's DL subframe and UL subframe configurations output from the subframe configuration determining section 402. The control section 404 controls operations pertaining to the enhanced dynamic TDD cell, including measurements, CSI measurements, RACH transmission, UCI feedback and sounding, based on commands from the primary cell (the radio base station 10).

The UL signal generating section 405 generates uplink control signals such as, for example, delivery acknowledgement signals and feedback signals, based on commands from the control section 404. Also, the UL signal generating section 404 generates uplink data signals based on commands from the control section 403. When a DL-only carrier is configured as the configuration for the enhanced dynamic TDD cell, the UL signal generating section 405 generates uplink control signals for DL signals, without generating uplink data signals.

The mapping section 406 controls the allocation of the uplink control signals and the uplink data signal to radio resources based on commands from the control section 404.

The present invention is by no means limited to the above embodiment and can be implemented in various modifications. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2014-004620, filed on Jan. 14, 2014, including the specification, drawings and abstract, is incorporated herein by reference in its entirety.

The invention claimed is:

1. A user terminal that executes radio communication with a plurality of cells by employing carrier aggregation, the user terminal comprising:
   a receiving section that, when a connection is established with a secondary cell serving as a dynamic TDD cell, receives control information, which is transmitted from a primary cell and which includes information on whether at least one subframe in the dynamic TDD cell are uplink subframes or downlink subframes; and
   a control section that controls operations pertaining to the dynamic TDD cell based on the control information,
   wherein the primary cell uses an FDD carrier and the dynamic TDD cell does not configure specific UL-DL configurations.

2. The user terminal according to claim 1, wherein the primary cell is a licensed band and the secondary cell is an unlicensed band.

3. The user terminal according to claim 1, wherein the control section identifies a specific subframe as a switching subframe based on the control signal.

4. The user terminal according to claim 1, wherein the control section identifies one of the subframes as a switching subframe based on the control signal upon identifying a switch from a downlink subframe to an uplink subframe in the dynamic TDD cell.

5. The user terminal according to claim 1, wherein the control section controls the subframe configuration of the dynamic TDD cell as a DL-only carrier based on the control signal.

6. The user terminal according to claim 5, wherein uplink carrier aggregation is not supported.

7. The user terminal according to claim 1, wherein the control section controls an operation for receiving device-to-device signals in subframes other than the downlink subframes.

8. The user terminal according to claim 1, wherein the control section controls an operation for transmitting device-to-device signals in the uplink subframes of the dynamic TDD cell based on the control signal.

9. A radio base station of a primary cell that communicates with a user terminal by employing carrier aggregation, the radio base station comprising:
- a selection section that, when the user terminal establishes a connection with a secondary cell serving as a dynamic TDD cell, selects uplink subframes or downlink subframes for at least one subframe in the dynamic TDD cell;
- a control section that controls transmission and reception between the user terminal and the dynamic TDD cell based on the result of the selection by the selection section; and
- a transmission section that reports a control signal including the result of the selection to the user terminal,
- wherein the primary cell uses an FDD carrier and the dynamic TDD cell does not configure specific UL-DL configurations.

10. A radio communication method for a user terminal that carries out radio communication with a plurality of cells by employing carrier aggregation, the radio communication method comprising:
- when a connection is established with a secondary cell serving as a dynamic TDD cell, receiving control information, which is transmitted from a primary cell and which includes information on whether at least one subframe in the dynamic TDD cell are uplink subframes or downlink subframes; and
- controlling operations pertaining to the dynamic TDD cell based on the control information;
- wherein the primary cell uses an FDD carrier and the dynamic TDD cell does not configure specific UL-DL configurations.

* * * * *